United States Patent [19]
Regel et al.

[11] 3,755,345
[45] Aug. 28, 1973

[54] BISTRIAZOLYL-BISPHENYL-METHANES AND THEIR SALTS

[75] Inventors: Erik Regel, Wuppertal-Cronenberg; Karl Heinz Büchel, Wuppertal-Elberfeld; Robert R. Schmidt, Leverkusen; Ludwig Eue, Cologne, all of Germany

[73] Assignee: Bayer Aktiengesellschaft, Leverkusen, Germany

[22] Filed: Sept. 24, 1970

[21] Appl. No.: 75,252

[30] Foreign Application Priority Data
Sept. 27, 1969  Germany.................. P 19 49 012.1

[52] U.S. Cl............. 260/308 R, 71/92, 260/465 G, 260/607 R, 260/607 A, 260/609 R, 260/612 R, 260/646, 260/651 R, 260/651 F
[51] Int. Cl. ........................ A01n 9/22, C07d 55/06
[58] Field of Search ................................ 260/308 R

[56] References Cited
OTHER PUBLICATIONS
Regel et al., Chem. Abstracts, Vol. 74, Abstract No. 125705t (1971). QD1A51

*Primary Examiner*—Alton D. Rollins
*Attorney*—Burgess, Dinklage & Sprung

[57] ABSTRACT

Bistriazolyl-bisphenyl-methanes, i.e., 3,3'-(fluoro, chloro, bromo, alkyl, aryl and substituted aryl) bistraizolebisphenyl-(optionally halo, nitro, cyano, trifluoromethyl, alkyl, alkoxy, alkylthio, alkylsulfinyl, alkylsulfonyl, phenyl, phenoxy, phenylthio, phenylsulfonyl and/or benzyl-substituted)-bistriazolyl-bisphenyl methanes and their salts, possess plant growth influencing, i.e., both growth stimulating and inhibiting and ever herbicidal properties.

12 Claims, No Drawings

BISTRIAZOLYL-BISPHENYL-METHANES AND THEIR SALTS

The present invention relates to and has for its objects the provision of certain novel compounds, and of new active compositions containing such compounds in the form of mixtures with solid and liquid dispersible carrier vehicles, specifically of certain new bistriazolyl-bisphenyl-methanes, i.e., 3,3'-(fluoro, chloro, bromo, alkyl, aryl and substituted aryl) bistriazole-bisphenyl-(optionally halo, nitro, cyano, trifluoromethyl, alkyl, alkoxy, alkylthio, alkylsulfinyl, alkylsulfonyl phenyl, phenoxy, phenylthio, phenylsulfonyl and/or benzyl-substituted)-bistriazolyl, bisphenyl methanes and their salts, which possess valuable plant growth influencing, i.e. both growth stimulating and inhibiting and even herbicidal, properties, and new methods for using such compounds especially for controlling and combating plants, i.e., by way of both growth stimulation and inhibition and even herbicidal effects, with other and further objects becoming apparent from a study of the within specification and accompanying examples.

It is known that succinic acid 2,2-dimethylhydrazide (A), 2-chloroethyltrimethylammonium chloride (B) and maleic acid hydrazide (C) can be used for the regulation of the growth of higher plants (cf. in this connection H.M. Cathy, "Physiology of growth retarding chemicals," Ann. Rev. Plant Phys. 15, pp. 271 – 302 (1964), Deutsche Auslegeschrift (German Published Specification 1,238,052 and U.S. Pat. Nos. 2,575,954, 2,614,912, 2,614,916, 2,614,917 and 2,805,926). The effect of the previously known substances on the plants is, however, in many cases not satisfactory.

The present invention provides new compounds which are bistriazolyl-bisphenyl-methanes of the following formula or salts thereof:

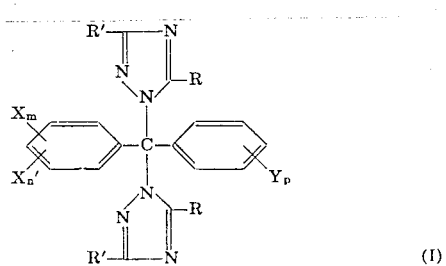

(I)

in which
R and R' are hydrogen, fluorine, chlorine, bromine, alkyl with 1-4 carbon atoms or (possibly substituted) aryl, X, X' and Y are halogen, nitro, cyano, trifluoromethyl, alkyl, alkoxy, alkylthio, alkylsufinyl or alkylsufonyl with in each case, 1–4 carbon atoms, phenyl, phenoxy phenylthio, phenylsulfonyl and/or benzyl, m, n and p are each 0, 1 or 2.

It has been found that these compounds exhibit strong plant-growth-influencing properties.

As salts of the bistriazolyl-bisphenyl-methanes, those with plant-compatible acids are naturally preferred for the treatment of plants. Examples of such acids are the halogen hydracids, phosphoric acids, sulfonic acids, aliphatic mono- and di-carboxylic acids as well as hydroxycarboxylic acids, for example acetic acid, propionic acid, maleic acid, succinic acid, fumaric acid, tartaric acid, citric acid, salicylic acid, sorbic acid and lactic acid, as well as 1,5-naphthalenedisulfonic acid.

The invention also provides a process for the production of a compound according to the invention in which a diphenyldihalomethane of the formula

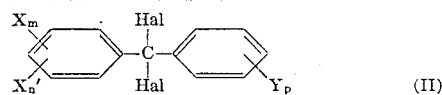

(II)

in which
Hal is chlorine or bromine, and
X, X', Y, m, n and p are the same as defined above
is reacted with a triazole derivative of the formula

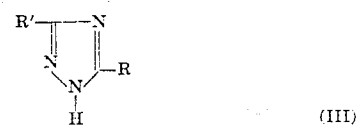

(III)

in which
R and R' are the same as defined above in the presence of an acid-binding agent.

Surprisingly, the bistriazolyl- bisphenyl-methanes according to the invention show a much greater growth-influencing activity than certain growth regulators known from the prior art. The compounds therefore represent a valuable enrichment of the art.

If, in the preparation of the compounds according to the invention, diphenyldichloromethane and 1,2,4-triazole are used as starting materials, the reaction course can be represented by the following formula scheme:

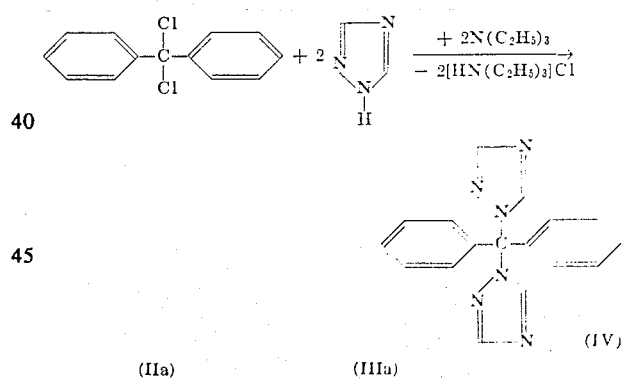

(IIa)        (IIIa)

X, X' and Y are preferably fluorine, chlorine, bromine, iodine, nitro, cyano, trifluoromethyl, methoxy or methylthio groups, m, n and p are preferably 0 or 1.

As examples of the diphenyldihalomethanes according to the invention there are mentioned in particular:
diphenyldichloromethane,
2-fluoro-diphenyldichloromethane,
3-fluoro-diphenyldichloromethane,
4-fluoro-diphenyldichloromethane,
2-chloro-diphenyldichloromethane,
3-chloro-diphenyldichloromethane,
4-chloro-diphenyldichloromethane,
2-bromo-diphenyldichloromethane,
3-bromo-diphenyldichloromethane,
4-bromo-diphenyldichloromethane,
2-nitro-diphenyldichloromethane, 3-nitro-diphenyldichloromethane,
4-nitro-diphenyldichloromethane,
2-cyano-diphenyldichloromethane,
3-cyano-diphenyldichloromethane,
4-cyano-diphenyldichloromethane,
2-methyl-diphenyldichloromethane,
3-methyl-diphenyldichloromethane,
4-methyl-diphenyldichloromethane,
2-ethyl-diphenyldichloromethane,
3-ethyl-diphenyldichloromethane,
4-ethyl-diphenyldichloromethane,
2-methoxy-diphenyldichloromethane,
3-methoxy-diphenyldichloromethane,
4-methoxy-diphenyldichloromethane,
2-methylthio-diphenyldichloromethane,
3-methylthio-diphenyldichloromethane,
4-methylthio-diphenyldichloromethane,
2-methylsulfinyl-diphenyldichloromethane,
3-methylsulfinyl-diphenyldichloromethane,
4-methylsulfinyl-diphenyldichloromethane,
2-methylsulfonyl-diphenyldichloromethane,
3-methylsulfonyl-diphenyldichloromethane,
4-methylsulfonyl-diphenyldichloromethane,
4-tert.-butyl-diphenyldichloromethane,
4-phenyl-diphenyldichloromethane,
2,4-dichloro-diphenyldichloromethane,
2,5-dichloro-diphenyldichloromethane,
3,4-dichloro-diphenyldichloromethane,
4-chloro-2-nitro-diphenyldichloromethane,
4-chloro-3-nitro-diphenyldichloromethane,
6-chloro-3-nitro-diphenyldichloromethane,
2-chloro-4-nitro-diphenyldichloromethane,
2,4-dinitro-diphenyldichloromethane,
3,4-dinitro-diphenyldichloromethane,
3,5-dinitro-diphenyldichloromethane,
4-nitro-3-methyl-diphenyldichloromethane,
3-nitro-4-methyl-diphenyldichloromethane,
2,2'-difluoro-diphenyldichloromethane,
2,3'-difluoro-diphenyldichloromethane,
2,4'-difluoro-diphenyldichloromethane,
3,3'-difluoro-diphenyldichloromethane,
3,4'-difluoro-diphenyldichloromethane,
4,4'-difluoro-diphenyldichloromethane,
2-fluoro-2'-chloro-diphenyldichloromethane,
2-fluoro-3'-chloro-diphenyldichloromethane,
2-fluoro-4'-chloro-diphenyldichloromethane,
3-fluoro-3'-chloro-diphenyldichloromethane,
3-fluoro-4'-chloro-diphenyldichloromethane,
4-fluoro-4'-chloro-diphenyldichloromethane,
4-fluoro-4'-bromo-diphenyldichloromethane,
2,2'-dichloro-diphenyldichloromethane,
2,3'-dichloro-diphenyldichloromethane,
2,4'-dichloro-diphenyldichloromethane,
3,3'-dichloro-diphenyldichloromethane,
3,4'-dichloro-diphenyldichloromethane,
4,4'-dichloro-diphenyldichloromethane,
2-chloro-4'-bromo-diphenyldichloromethane,
3-chloro-4-bromo-diphenyldichloromethane,
4-chloro-4'-bromo-diphenyldichloromethane,
4-fluoro-2'-nitro-diphenyldichloromethane,
4-fluoro-3'-nitro-diphenyldichloromethane,
4-fluoro-4'-nitro-diphenyldichloromethane,
4-chloro-2'-nitro-diphenyldichloromethane,
4-chloro-3'-nitro-diphenyldichloromethane,
4-chloro-4'-nitro-diphenyldichloromethane,
4-bromo-2'-nitro-diphenyldichloromethane,
4-bromo-3'-nitro-diphenyldichloromethane,
4-bromo-4'-nitro-diphenyldichloromethane,
4-fluoro-4'-cyano-diphenyldichloromethane,
4-chloro-4'-cyano-diphenyldichloromethane,
4-bromo-4'-cyano-diphenyldichloromethane,
2-methyl-2'-fluoro-diphenyldichloromethane,
2-methyl-3'-fluoro-diphenyldichloromethane,
2-methyl-4'-fluoro-diphenyldichloromethane,
2-methyl-2'-chloro-diphenyldichloromethane,
2-methyl-3'-chloro-diphenyldichloromethane,
2-methyl-4'-chloro-diphenyldichloromethane,
3-methyl-2'-fluoro-diphenyldichloromethane,
3-methyl-3'-fluoro-diphenyldichloromethane,
3-methyl-4'-fluoro-diphenyldichloromethane,
3-methyl-2'-chloro-diphenyldichloromethane,
3-methyl-3'-chloro-diphenyldichloromethane,
3-methyl-4'-chloro-diphenyldichloromethane,
4-methyl-2'-chloro-diphenyldichloromethane,
4-methyl-3'-chloro-diphenyldichloromethane,
4-methyl-4'-chloro-diphenyldichloromethane,
4-tert.-butyl-2'-fluoro-diphenyldichloromethane,
4-tert.-butyl-3'-fluoro-diphenyldichloromethane,
4-tert.-butyl-4'-fluoro-diphenyldichloromethane,
4-tert.-butyl-2'-chloro-diphenyldichloromethane,
4-tert.-butyl-3'-chloro-diphenyldichloromethane,
4-tert.-butyl-4'-chloro-diphenyldichloromethane,
2,4-dichloro-2'-fluoro-diphenyldichloromethane,
2,4-dichloro-3'-fluoro-diphenyldichloromethane,
2,4-dichloro-4'-fluoro-diphenyldichloromethane,
2,4-dichloro-2'-chloro-diphenyldichloromethane,
2,4-dichloro-3'-chloro-diphenyldichloromethane,
2,4-dichloro-4'-chloro-diphenyldichloromethane,
2,5-dichloro-2'-fluoro-diphenyldichloromethane,
2,5-dichloro-3'-fluoro-diphenyldichloromethane,
2,5-dichloro-4'-fluoro-diphenyldichloromethane,
2,5-dichloro-2'-chloro-diphenyldichloromethane,
2,5-dichloro-3'-chloro-diphenyldichloromethane,
2,5-dichloro-4'-chloro-diphenyldichloromethane,
3,4-dichloro-2'-fluoro-diphenyldichloromethane,
3,4-dichloro-3'-fluoro-diphenyldichloromethane,
3,4-dichloro-4'-fluoro-diphenyldichloromethane,
3,4-dichloro-2'-chloro-diphenyldichloromethane,
3,4-dichloro-3'-chloro-diphenyldichloromethane,
3,4-dichloro-4'-chloro-diphenyldichloromethane,
4-chloro-2'-fluoro-2-nitro-diphenyldichloromethane,
4-chloro-3'-fluoro-2-nitro-diphenyldichloromethane,
4-chloro-4'-fluoro-2-nitro-diphenyldichloromethane,
4-chloro-2'-chloro-2-nitro-diphenyldichloromethane,
4-chloro-3'-chloro-2-nitro-diphenyldichloromethane,
4-chloro-4'-chloro-2-nitro-diphenyldichloromethane,
4-chloro-2'-fluoro-3-nitro-diphenyldichloromethane,
4-chloro-3'-fluoro-3-nitro-diphenyldichloromethane,
4-chloro-4'-fluoro-3-nitro-diphenyldichloromethane,
4-chloro-2'-chloro-3-nitro-diphenyldichloromethane,
4-chloro-3'-chloro-3-nitro-diphenyldichloromethane,
4-chloro-4'-chloro-3-nitro-diphenyldichloromethane,
6-chloro-4'-fluoro-3-nitro-diphenyldichloromethane,
6-chloro-4'-fluoro-3-nitro-diphenyldichloromethane,
2-chloro-4'-chloro-4-nitro-diphenyldichloromethane,
2-chloro-4'-fluoro-4-nitro-diphenyldichloromethane,
4-chloro-2', 4'-dinitro-diphenyldichloromethane, 4-chloro-3', 4'-dinitro-diphenyldichloromethane,
4-chloro-3', 5'-dinitro-diphenyldichloromethane,
4-chloro-3'-methyl-4'-nitro-diphenyldichloromethane,
4-chloro-4'-methyl-3'-nitro-diphenyldichloromethane,
2,2',5,5'-tetrachloro-diphenyldichloromethane,
2-fluoro-4'-methoxy-diphenyldichloromethane,
3-fluoro-4'-methoxy-diphenyldichloromethane,
4-fluoro-4'-methoxy-diphenyldichloromethane,
2-chloro-4'-methoxy-diphenyldichloromethane,
3-chloro-4'-methoxy-diphenyldichloromethane,
4-chloro-4'-methoxy-diphenyldichloromethane,
2-methyl-4'-methoxy-diphenyldichloromethane,
3-methyl-4'-methoxy-diphenyldichloromethane,
4-methyl-4'-methoxy-diphenyldichloromethane,
2-fluoro-4'-methylthio-diphenyldichloromethane,
3-fluoro-4'-methylthio-diphenyldichloromethane,
4-fluoro-4'-methylthio-diphenyldichloromethane,
2-chloro-4'-methylthio-diphenyldichloromethane,
3-chloro-4'-methylthio-diphenyldichloromethane,
4-chloro-4'-methylthio-diphenyldichloromethane,
2,4-dichloro-4'-methylthio-diphenyldichloromethane,
2,5-dichloro-4'-methylthio-diphenyldichloromethane,
3,4-dichloro-4'-methylthio-diphenyldichloromethane,
2,4-dichloro-4'-methoxy-diphenyldichloromethane,
2,5-dichloro-4'-methoxy-diphenyldichloromethane,
3,4-dichloro-4'-methoxy-diphenyldichloromethane,
4-ethylthio-2-chloro-diphenyldichloromethane,
4-ethylsulfonyl-2-chloro-diphenyldichloromethane.

The diphenyldihalomethanes of the formula (II) used as starting materials are, for the most part, known. Some not yet known compounds can be prepared in manner known in principle.

R and R' are preferably hydrogen.

A typical example of a compound of formula (III) is 1,2,4-triazole, which is known.

The reaction may be carried out in the presence of a solvent this term includes a mere diluent. For this purpose, all inert organic solvents are suitable. Preferred solvents include ketones, such as acetone, methylethyl ketone and diethyl ketone; dimethyl formamide, acetonitrile and nitromethane are also very suitable.

As acid acceptor, two further equivalents of the triazole derivative can be used; preferably, however, the appropriate amount of one of the customary tertiary amines, such as triethylamine, dimethylaniline or N,N-dimethylbenzylamine, is used. Alternatively, all customary inorganic acid-binding agents can be used. Preferred ones include the alkali metal hydroxides and the alkali metal carbonates.

The reaction temperatures can be varied within a fairly wide range. In general, the reaction is carried at between about 0° to 120° C, preferably at about 20° to 90° C.

When carrying out the reaction according to the invention, 2 moles of triazole and 2 moles of acid-binding agent are generally used for each mole of diphenyldihalomethane. Amounts greater or lesser by up to 20 percent are possible without significant diminution of yield.

The conversion of the free compounds of the formula (I) into their salts may be effected in manner known in principle. For example, 2.2 moles of the desired acid may be added, per mole of bistriazolyl-bisphenyl-methane, dissolved in a suitable solvent.

The active compounds which can be used according to the invention interfere with the physiologic phenomena of plant growth and can therefore be used as plant growth regulators.

The different effects of the active compounds depend essentially on the point in time of the application, with reference to the development stage of the seed or the plant as well as on the concentrations applied.

Plant growth regulators are used for various purposes which are connected with the development stage of the plant.

Thus, with plant growth regulators, the seed dormancy can be broken in order to cause the seeds to germinate at a certain desired time at which the seed itself shows no readiness to germinate. The seed germination itself can be either inhibited or promoted by such active compounds, depending on the concentration applied. This inhibition or promotion relates to the seedling development.

The bud dormancy of the plants, that is to say the endogenic annual cycle, can be influenced by the active compounds, so that, for example, the plants shoot or blossom at a point in time at which they normally show no readiness to shoot or blossom.

The shoot or root growth can be promoted or inhibited by the active compounds in manner dependent on the concentration. Thus, it is possible to inhibit very strongly the growth of the fully formed plant, or to bring the plant as a whole to a more robust state, or to produce a dwarf growth.

An example of the application of growth regulators lies in the suppression or reduction of grass growth at roadsides and waysides. Further, the growth of lawns can be inhibited by growth regulators, so that the frequency of grass-cutting (of lawn-mowing) can be reduced.

During the growth of the plant, the branching to the side can also be multiplied by a chemical breaking of the apical dominance. This phenomenon can be very useful in the propagation of plants by cuttings. On the other hand; depending on the concentration used, it is possible to inhibit the growth of side-shoots, for example in tobacco plants in order to prevent the formation of side-shoots after decapitation and thus to promote the leaf growth.

Blossom formation can also be influenced. Thus, depending on the concentration and the point in time of application, either a retarding or an acceleration of blossom formation can be achieved. In certain circumstances, a multiplication of blossom initiation can be attained, when the appropriate treatments are carried out at the time of the normal blossom formation.

The influence of the active compounds on the foliage of the plants can be so regulated that a defoliation is achieved, for example in order to facilitate the harvest or to reduce transpiration at a time at which the plants are to be transplanted.

Fruit initiation can be promoted so that more, or seedless, fruits are formed (parthenocarpy). In certain conditions, the premature fall of fruit can also be prevented, or the fruit fall can be promoted up to a certain extent in the sense of a chemical thinning out. The promotion of the fruit fall can, however, also be so exploited that the treatment is effected at the time of the harvest, so as to facilitate harvesting.

The active compounds according to the present invention can be converted into the usual formulations, such as solutions, emulsions, suspensions, powders, pastes and granulates. These may be produced in known manner, for example by mixing the active compounds with extenders, that is, liquid or solid diluents or carriers, optionally with the use of surface-active agents, that is emulsifying agents and/or dispersing agents. In the case of the use of water as an extender, organic solvents can, for example, also be used as auxiliary solvents.

As liquid diluents or carriers, there are preferably used aromatic hydrocarbons, such as xylenes or benzene, chlorinated aromatic hydrocarbons, such as chlorobenzenes, paraffins, such as mineral oil fractions, alcohols, such as methanol or butanol, or strongly polar solvents, such as dimethyl formamide or dimethyl sulfoxide, as well as water.

As solid diluents or carriers, there are preferably used ground natural minerals, such as kaolins, clays, talc or chalk, or ground synthetic minerals, such as highly-dispersed silicic acid or silicates.

Preferred examples of emulsifying agents include non-ionic and anionic emulsifiers, such as polyoxyethylene-fatty acid esters, polyoxyethylene-fatty alcohol ethers, for example alkylarylpolyglycol ethers, alkyl sulfonates and aryl sulfonates; and preferred examples of dispersing agents include lignin, sulfite waste liquors and methyl cellulose.

The formulations contain, in general, from 0.1 to 95, preferably 0.5 to 90, per cent by weight of active compound.

The active compounds may be applied as such or in the form of their formulations or of the application forms prepared therefrom, such as ready-to-use solutions, emulsifiable concentrates, emulsions, suspensions, spray powders, pastes; soluble powders, dusting agents and granulates. Application may take place in the usual manner, for example by watering, squirting, spraying, scattering, dusting, etc.

The concentrations of active compound can be varied within a fairly wide range for actual application. In general, concentrations of 0.0005 to 2 percent, preferably of 0.01 to 0.5 percent, are used.

Further, there are applied in general, 0.1 to 100 kg, preferably 1 to b 10 kg, of active compound per hectare of soil area.

For the application time, it is usually valid to say that application is most favorable when a strong elongation growth has occurred, that is at the so-called "time of greatest shooting." In ligneous plants, application is usually preferred shortly after commencement of shooting. Thus, in contrast to the application of insecticides and fungicides, the application of the growth regulators is effected in a preferred space of time, the precise delimitation of which is governed by the climatic and vegetative circumstances.

The compounds according to the invention are, in some cases, also effective against plant-damaging fungi and bacteria.

The invention therefore provides a plant growth regulating composition containing as active ingredient a compound according to the invention in admixture with a solid diluent or carrier or in admixture with a liquid diluent or carrier containing a surface-active agent.

The invention also provides a method of controlling the growth of plants which comprises applying to the plants or seeds thereof a compound according to the invention alone or in the form of a composition containing as active ingredient a compound according to the invention in admixture with a solid or liquid diluent or carrier.

The activity of the compounds according to the invetion is illustrated without limitation by the following Examples.

Example 1

Growth inhibition/linseed test
Solvent: 40 parts by weight acetone
Emulsifier: 0.25 part by weight alkylaryl polyglycolether To produce a suitable preparation of active compound, 1 part by weight of active compound is mixed with the stated amount of solvent which contains the stated amount of emulsifier, and the resulting concentrate is diluted with a disodium hydrogen phosphate-potassium dihydrogen phosphate buffer solution (pH 6) to the desired final concentration.

Two batches each of 25 linseeds are laid out on a filter paper in a Petri dish.

10 ml of the preparation of active compound are pipetted into each dish. Germination of the seeds takes place in the dark at 25° C.

After 3 days, the length of the roots is determined and the growth inhibition compared with the control plants is expressed as a percentage. 100 percent denotes the standstill of growth, and 0 percent denotes a growth corresponding to that of the untreated plant.

The active compounds, the concentration of the active compounds in ppm (=mg/kg) and results can be seen from Table 1.

The test compounds representative of the invention are identified as follows:
Compound (1) Bistriazolyl-4-chlorophenylmethane.
Compound (2) Bistriazolyl-diphenylmethane.
Compound (3) Bistriazolyl-phenyl-2-chlorophenylmethane
Compound (4) Bistriazolyl-4,4'-difluorophenylmethane.
Compound (5) Bistriazolyl-4-fluorophenylphenylmethane.
Compound (6) Bistriazolyl-4-fluorophenyl-4'-nitrophenylmethane.
Compound (7) Bistriazolyl-3-chlorophenylphenylmethane.
Compound (8) Bistriazolyl-4-methoxyphenylphenylmethane.
Compound (9) Bistriazolyl-4-cyanophenyl-4'-fluorophenylmethane.

TABLE 1.—GROWTH INHIBITION/LINSEED TEST

| Active compound | Percent inhibition with | |
| --- | --- | --- |
| | 50 p.p.m. | 250 p.p.m. |
| Water (control) | 0 | 0 |
| (A) succinic acid 2,2-dimethylhydrazide (known) | 12 | 15 |
| (B) (2-chloroethyl)-trimethyl-ammonium chloride (known) | 20 | 30 |
| (C) Maleic acid hydrazide (known) | 36 | 50 |

Table 1—Continued

| Active compound | Percent inhibition with | |
|---|---|---|
| | 50 p.p.m. | 250 p.p.m. |
| (1) [structure: Cl-phenyl, phenyl, two triazolyl groups on central C] | 76 | 89 |
| (2) [structure: two phenyl, two triazolyl on central C] | 65 | 78 |
| (3) [structure: phenyl, Cl-phenyl, two triazolyl on central C] | 80 | 97 |
| (4) [structure: two F-phenyl (para), two triazolyl on central C] | 60 | 68 |
| (5) [structure: F-phenyl, phenyl, two triazolyl on central C] | 65 | 80 |
| (6) [structure: F-phenyl, NO₂-phenyl, two triazolyl on central C] | 50 | 58 |

Example 2

Growth inhibition/oat grains

Solvent: 40 parts by weight acetone
Emulsifier: 0.25 part by weight alkylaryl polyglycol ether To produce a suitable preparation of active compound, 1 part by weight of active compound is mixed with the stated amount of solvent which contains the stated amount of emulsifier, and the resulting concentrate is diluted with a disodium hydrogen phosphate-potassium dihydrogen phosphate buffer solution (pH 6) to the desired final concentration.

Two batches each of 25 oat grains are laid out on a filter paper in a petri dish. 10 ml of the preparation of active compound are pipetted into each dish. Germination of the seeds takes place in the dark at 25°C.

After 3 days, the length of the shoot is determined and the growth inhibition compared with the control plant is expressed as a percentage. 100 percent denotes the standstill of growth, and 0 percent denotes a growth corresponding to that of the untreated plant.

The active compounds, concentrations of the active compounds in ppm (=mg/kg) and the results can be seen from Table 2.

TABLE 2.—GROWTH INHIBITION/OAT GRAINS TEST

| Active compound | Percent inhibition with | |
|---|---|---|
| | 50 p.p.m. | 250 p.p.m. |
| Water (control) | 0 | 0 |
| (A) succinic acid 2,2-dimethylhydrazide (known) | 22 | 37 |
| (B) (2-chloroethyl)-trimethyl-ammonium chloride (known) | 22 | 31 |
| (C) maleic acid hydrazide (known) | 20 | 40 |

TABLE 2.—Continued

| Active compound | Percent inhibition with | |
|---|---|---|
| | 50 p.p.m. | 250 p.p.m. |
| (1) 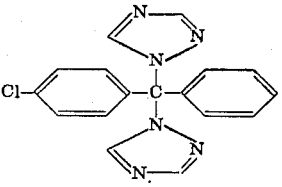 | 48 | 100 |
| (2) 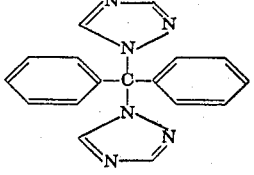 | 44 | 48 |
| (3) 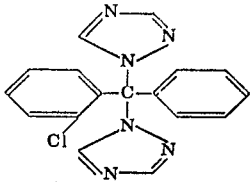 | 53 | 96 |
| (7) 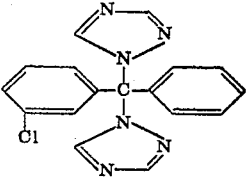 | 42 | 70 |

Example 3

Growth inhibition/apple seedlings
Solvent:     40 parts by weight acetone
Emulsifier:  0.25 part by weight alkylaryl polyglycol ether To produce a suitable preparation of active compound, 1 part by weight of active compound is mixed with the stated amount of solvent which contains the stated amount of emulsifier, and the resulting concentrate is diluted with a disodium hydrogen phosphate-potassium dihydrogen phosphate buffer solution (pH 6) to the desired final concentration.

Apple seedlings are, at a height of about 2 cm, sprayed with a preparation which contains 500 ppm of active compound.

After 7 days, the percentage inhibition of the treated plants compared with the untreated control plant is determined. With 100 percent inhibition, no growth is present; with 0 percent inhibition, the growth corresponds to that of the control plant.

The active compounds, the concentrations of the active compounds in ppm (=mg/kg) and the results can be seen from Table 3.

TABLE 3.—GROWTH INHIBITION/APPLE SEEDLINGS TEST

| Active compound | Percent inhibition with 500 p.p.m. |
|---|---|
| Water (control) | 0 |
| (A) succinic acid 2,2-dimethylhydrazide (known) | 23 |
| (B) (2-chloroethyl)-trimethyl-ammonium chloride (known) | 25 |
| (3) 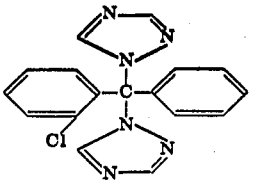 | 57 |
| (2) 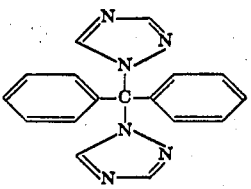 | 33 |

TABLE 3.—Continued
GROWTH INHIBITION/APPLE SEEDLINGS TEST

| Active compound | Percent inhibition with 500 p.p.m. |
|---|---|
| (1) [4-Cl-phenyl, phenyl, bis-triazolyl methane structure] | 35 |

Example 4

Growth inhibition/tomato plants

Solvent: 40 parts by weight acetone
Emulsifier: 0.25 part by weight alkylaryl polyglycol ether To produce a suitable preparation of active compound, 1 part by weight of active compound is mixed with the stated amount of solvent which contains the stated amount of emulsifier, and the resulting concentrate is diluted with a disodium hydrogen phosphate-potassium dihydrogen phosphate buffer solution (pH 6) to the desired final concentration.

Tomato plants of a height of 10 cm are treated with preparations which contains 500 ppm of active compound.

After 8 days, the percentage inhibition of the treated plants compared with the untreated control plant is determined. With 100 percent inhibition, no growth is present, with 0 percent inhibition, the growth corresponds to that of the control plant.

The active compounds, the concentrations of the active compounds in ppm (=mg/kg) and the results can be seen from Table 4.

Example 5

Retardation of blossom formation/tomato plants test

Solvent: 40 parts by weight acetone
Emulsifier: 0.25 part by weight alkylaryl polyglycol ether To produce a suitable preparation of active compound, 1 part by weight of active compound is mixed with the stated amount of solvent which contains the stated amount of emulsifier, and the resulting concentrate is diluted with a disodium hydrogen phosphate-potassium dihydrogen phosphate buffer solution (pH 6) to the desired final concentration.

Tomato plants of a height of 20 cm are sprayed with preparations which contain 1,000 ppm of active compound. Blossom formation is thereby retarded.

The active compounds and the results can be seen from Table 5.

TABLE 4.—GROWTH INHIBITION/TOMATO PLANTS TEST

| Active compound | Percent, inhibition with 500 p.p.m. |
|---|---|
| Water (control) | 0 |
| (A) succinic acid 2,2-dimethylhydrazide (known) | 20 |
| (B) (2-chloroethyl)-trimethyl-ammonium chloride (known) | 25 |
| (C) maleic acid hydrazide (known) | 33 |
| (3) [2-Cl-phenyl, phenyl, bis-triazolyl methane structure] | 50 |
| (8) [4-CH₃O-phenyl, phenyl, bis-triazolyl methane structure] | 37 |
| (1) [4-Cl-phenyl, phenyl, bis-triazolyl methane structure] | 36 |

TABLE 5.—RETARDATION OF BLOSSOM FORMATION/
TOMATO PLANTS TEST

| Active compound | Retardation in days |
|---|---|
| Water (control) | 0 |
| (1) 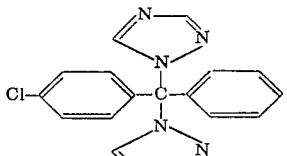 | 11 |
| (9) 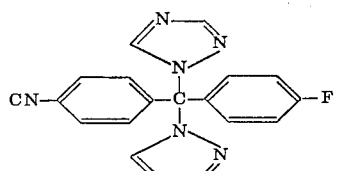 | 7 |
| (3) 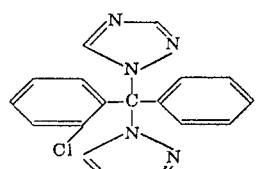 | 7 |
| (8) 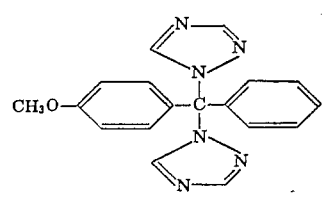 | 9 |

Example 6

Excessive shoot growth of petunias, zinnias, asters and carnations is prevented by treatment with the compounds according to the invention. For this purpose, the plants are sprayed, immediately at the commencement of their elongation growth, with a preparation which contains 1,000 ppm of active compound. A second application can, if necessary, be effected with a preparation which contains 1,000 or even only 500 ppm of active compound.

EXAMPLE 7

The apical dominance of chrysanthemums and carnations is broken by the substances described. As a result, an increased formation of side-branches occurs. The latter can serve for cuttings propagation. The plants, at a height of about 25 cm, are sprayed once to twice with preparations which contain 500 or 1,000 ppm of active compound. The plants receive thereby a more compact status, and many lateral branchings occur.

The following further examples illustrate, without limitation, the process for producing the particular new compounds of the present invention.

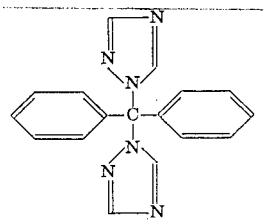
(2)

To a solution of 27.2 g (0.4 mole) 1,2,4-triazole and 40.4 g (0.4 mole) triethylamine in 400 ml acetonitrile, 47.4 g (0.2 mole) diphenyldichloromethane are added dropwise, triethylamine hydrochloride separation begins at room temperature. To complete the reaction, heating to 80° C is effected for an hour. After cooling, the reaction mixture is stirred together with 500 ml benzene and washed salt-free with water. The benzene solution is dried over anhydrous sodium sulfate, filtered and concentrated by evaporation; after recrystallization of the crude product from acetonitrile, 43 g of pure bistriazolyl-bisphenyl-methane having a melting point of 210° C are obtained. Yield: 56 percent of the theory.

The same compound is obtained when, as starting compound, diphenyldibromomethane is used instead of the dichloromethane compound.

EXAMPLE 9

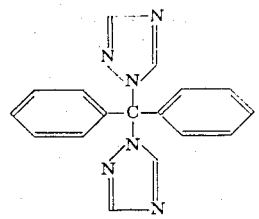
(2)

To a solution of 27.6 g (0.4 mole) 1,2,4-triazole and 40.4 g (0.4 mole) triethylamine in 300 ml acetonitrile there are added dropwise 54 g (0.2 mole) 4-chlorophenylphenyldichloromethane, triethylammonium chloride separation begins at room temperature. To complete the reaction, heating to 80° C is effected for 12 hours. After cooling, the reaction mixture is stirred together with 500 ml benzene and washed salt-free with water. The benzene solution is dried over anhydrous sodium sulfate, filtered and concentrated by evaporation; after recrystallization of the crude product from acetonitrile, 20 g of pure bistriazolyl-4-chlorophenylphenylmethane having a melting point of 170° C are obtained.

Examples 10–21

In corresponding manner, the following compounds of the general formula (I) (in which R and R' are hydrogen and X, X', Y, m, n and p are as shown in the Table below)

| Example | x | m | X' | n | Y | p | m.p.°C | *) |
|---|---|---|---|---|---|---|---|---|
| 10 | 2-Cl | 1 | - | 0 | - | 0 | 205 | (3) |
| 11 | 4-OCH₃ | 1 | - | 0 | - | 0 | 146 | (8) |
| 12 | 4-F | 1 | - | 0 | - | 0 | 198 | (5) |
| 13 | 3-Cl | 1 | - | 0 | - | 0 | 118 | (7) |
| 14 | 4-CN | 1 | - | 0 | - | 0 | 105 | |
| 15 | 4-F | 1 | - | 0 | 4-F | 1 | 200 | (4) |
| 16 | 4-F | 1 | - | 0 | 4-NO₂ | 1 | 185 | (6) |
| 17 | 4-F | 1 | - | 0 | 4-CN | 1 | 75 | (9) |
| 18 | 4-Cl | 1 | - | 0 | 4-Cl | 1 | 170 | |
| 19 | 4-Cl | 1 | 3-NO₂ | 1 | - | 0 | 84 | |
| 20 | 4-CH₃ | 1 | 3-NO₂ | 1 | - | 0 | 90 | |
| 21 | 2-Cl | 1 | 5-Cl | 1 | - | 0 | 125 | |

*) Numbers of active compound (cf. tables 1 - 5)

Example 22

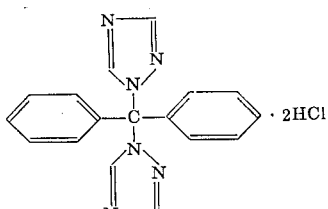

(19)

The bistriazolyl-diphenylmethane hydrochloride is obtained by reaction of 0.2 mole bistriazolyl-bisphenylmethane (cf. Example 8) with 0.44 mole hydrogen chloride in carbon tetrachloride as diluent; it possess the melting point 204° C.

EXAMPLE 23

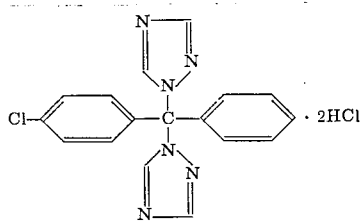

(20)

The bistriazolyl-4-chlorophenylphenylmethane hydrochloride is obtained according to the preceding Example. The melting point lies at 180° C.

Example 24

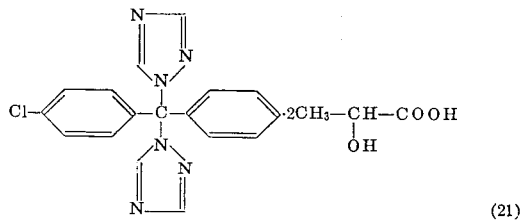

(21)

The bistriazolyl-4-chlorophenylphenylmethane lactate is prepared by reaction of 0.2 mole bistriazolyl-4-chlorophenylphenylmethane (cf. Example 9) with 0.44 mole lactic acid in acetonitrile as diluent.

It will be appreciated that the instant specification and examples are set forth by way of illustration and not limitation, and that various modifications and changes may be made without departing from the spirit and scope of the present invention.

What is claimed is:

1. Bistriazolyl-bisphenyl-methanes of the following formula or salts thereof:

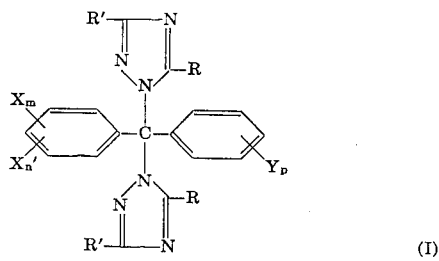

(I)

in which
R and R' are hydrogen;
X, X' and Y are individually selected from the group consisting of halogen, nitro, cyano, trifluoromethyl, alkyl, alkoxy, having, in each case, 1 to 4 carbon atoms, or methylthio; $m$, $n$ and $p$ are each 0 or 1.

2. Compounds according to claim 1 in which X, X' and Y are halogen, nitro, cyano, trifluoromethyl, methoxy or methylthio.

3. Compounds according to claim 1 in which R and R' are hydrogen, X is chlorine, fluorine, cyano, methyl or methoxy, X' is chlorine or nitro, Y is chlorine, fluorine, cyano or nitro, and $m$, $n$ and $p$ are each 0 or 1.

4. Compound according to claim 1 wherein such compound is bistriazolyl-4-chlorophenylphenylmethane.

5. Compound according to claim 1 wherein such compound is bistriazolyl-diphenylmethane.

6. Compound according to claim 1 wherein such compound is bistriazolyl-2-chlorophenylphenylmethane.

7. Compound according to claim 1 wherein such compound is bistriazolyl-4,4'-difluorophenylmethane.

8. Compound according to claim 1 wherein such compound is bistriazolyl-4-fluorophenylphenylmethane.

9. Compound according to claim 1 wherein such compound is bistriazolyl-4-fluorphenyl-4'-nitrophenylmethane.

10. Compound according to claim 1 wherein such compound is bistriazolyl-3 chlorophenylphenylmethane.

11. Compound according to claim 1 wherein such compound is bistriazolyl-4-methoxyphenylphenylmethane.

12. Compound according to claim 1 wherein such compound is bistriazolyl-4-cyanophenyl-4'-fluorophenylmethane.

* * * * *